(12) United States Patent
Nixon et al.

(10) Patent No.: US 8,775,967 B2
(45) Date of Patent: Jul. 8, 2014

(54) INTEGRATED GRAPHICAL RUNTIME INTERFACE FOR PROCESS CONTROL SYSTEMS

(75) Inventors: Mark J. Nixon, Round Rock, TX (US); Ken J. Beoughter, Round Rock, TX (US); Bruce Campney, Manor, TX (US); Tennyson Hao, Quezon (PH); Richard Rodriguez, Quezon (PH); Cheyenne Hernanadez, Austin, TX (US); Stephen Gilbert, Austin, TX (US)

(73) Assignee: Fisher-Rosemount Systems, Austin, TX (US)

( * ) Notice: Subject to any disclaimer, the term of this patent is extended or adjusted under 35 U.S.C. 154(b) by 1618 days.

(21) Appl. No.: 11/556,347

(22) Filed: Nov. 3, 2006

(65) Prior Publication Data

US 2007/0150081 A1    Jun. 28, 2007

Related U.S. Application Data

(63) Continuation of application No. PCT/US2005/015439, filed on May 4, 2005.

(60) Provisional application No. 60/567,980, filed on May 4, 2004.

(51) Int. Cl.
*G06F 3/00* (2006.01)
*G06F 3/048* (2006.01)

(52) U.S. Cl.
USPC .................... 715/795; 715/751; 715/779

(58) Field of Classification Search
USPC ........................ 715/965, 751, 779
See application file for complete search history.

(56) References Cited

U.S. PATENT DOCUMENTS

| | | | |
|---|---|---|---|
| 5,168,441 | A | 12/1992 | Onarheim et al. |
| 5,611,059 | A | 3/1997 | Benton |
| 5,631,825 | A | 5/1997 | Van Weele et al. |
| 5,680,409 | A | 10/1997 | Qin et al. |
| 5,706,455 | A | 1/1998 | Benton et al. |

(Continued)

FOREIGN PATENT DOCUMENTS

| | | |
|---|---|---|
| EP | 0 813 129 A2 | 12/1997 |
| EP | 1 122 652 A | 8/2001 |

(Continued)

OTHER PUBLICATIONS

State Intellectual Property Office of P.R. China, "The Notification of the Third Office Action," issued in connection with Chinese application No. 200580014271.1, issued Jun. 26, 2009, 8 pages.

(Continued)

*Primary Examiner* — David Phantana Angkool
(74) *Attorney, Agent, or Firm* — Hanley, Flight & Zimmerman, LLC

(57) ABSTRACT

An integrated graphical runtime interface that provides a secure, highly available environment for process control systems is disclosed. In one example, a method for displaying process control information via a graphical user interface instantiates a runtime workspace application to operatively interpose between an operator station operating system and a user. The example method displays a plurality of panels via the graphical user interface and displays a portion of the process control information associated with a runtime application in at least one of the plurality of panels via the runtime workspace application.

30 Claims, 9 Drawing Sheets

(56) References Cited

U.S. PATENT DOCUMENTS

| | | | |
|---|---|---|---|
| 5,841,654 | A | 11/1998 | Verissimo et al. |
| 5,926,177 | A | 7/1999 | Hatanaka et al. |
| 6,173,208 | B1 | 1/2001 | Park et al. |
| 6,362,839 | B1 | 3/2002 | Hamilton et al. |
| 6,385,496 | B1 | 5/2002 | Irwin et al. |
| 6,396,516 | B1 | 5/2002 | Beatty |
| 6,445,963 | B1 | 9/2002 | Blevins et al. |
| 6,571,133 | B1 | 5/2003 | Mandl et al. |
| 6,587,108 | B1 | 7/2003 | Guerlain et al. |
| 6,618,630 | B1 | 9/2003 | Jundt et al. |
| 6,633,782 | B1 | 10/2003 | Schleiss et al. |
| 6,691,280 | B1 | 2/2004 | Dove et al. |
| 6,957,110 | B2 | 10/2005 | Wewalaarachchi et al. |
| 6,973,508 | B2 | 12/2005 | Shepard et al. |
| 7,043,311 | B2 | 5/2006 | Nixon et al. |
| 7,110,835 | B2 | 9/2006 | Blevins et al. |
| 7,552,222 | B2 * | 6/2009 | Garimella et al. ............ 709/229 |
| 7,617,392 | B2 * | 11/2009 | Hair ............................... 713/165 |
| 7,702,409 | B2 * | 4/2010 | Lucas et al. ...................... 700/96 |
| 7,729,789 | B2 * | 6/2010 | Blevins et al. ................... 700/83 |
| 2002/0019672 | A1 | 2/2002 | Paunonen |
| 2002/0022894 | A1 | 2/2002 | Eryurek et al. |
| 2002/0022895 | A1 | 2/2002 | Genise et al. |
| 2002/0055790 | A1 | 5/2002 | Havekost |
| 2002/0077711 | A1 | 6/2002 | Nixon et al. |
| 2003/0014500 | A1 | 1/2003 | Schleiss et al. |
| 2003/0028269 | A1 | 2/2003 | Spriggs et al. |
| 2003/0191803 | A1 | 10/2003 | Chinnici et al. |
| 2003/0236576 | A1 | 12/2003 | Resnick et al. |
| 2004/0075689 | A1 | 4/2004 | Schleiss et al. |
| 2004/0123118 | A1 * | 6/2004 | Dahan et al. ................... 713/189 |
| 2005/0197803 | A1 | 9/2005 | Eryurek et al. |
| 2005/0197805 | A1 | 9/2005 | Eryurek et al. |
| 2005/0197806 | A1 | 9/2005 | Eryurek et al. |

FOREIGN PATENT DOCUMENTS

| | | |
|---|---|---|
| GB | 2 349 958 A | 11/2000 |
| JP | 2-124596 | 5/1990 |
| JP | 05053641 | 5/1993 |
| WO | 95/04314 A1 | 2/1995 |
| WO | 02/071169 A | 9/2002 |
| WO | 03/075206 A | 9/2003 |
| WO | 2005/107409 A2 | 11/2005 |
| WO | 2005/107410 A1 | 11/2005 |
| WO | 2005/107416 A1 | 11/2005 |
| WO | 2005/109122 A1 | 11/2005 |
| WO | 2005/109123 A1 | 11/2005 |
| WO | 2005/109124 A1 | 11/2005 |
| WO | 2005/109126 A1 | 11/2005 |
| WO | 2005/109127 A1 | 11/2005 |
| WO | 2005/109128 A1 | 11/2005 |
| WO | 2005/109129 A1 | 11/2005 |
| WO | 2005/109130 A1 | 11/2005 |
| WO | 2005/109131 A1 | 11/2005 |
| WO | 2005/109250 A1 | 11/2005 |
| WO | 2005/109250 A2 | 11/2005 |

OTHER PUBLICATIONS

Camo Software, Inc, The Unscrambler 9.6 product datasheet, www.camo.com, 2 pages.
Statsoft, Statistica: Multivariate Statistical Process Control product datasheet, www.statsoft.com, 2 pages.
UMetrics Inc., Product Specification for SIMCA-P 11, www.umetrics.com, 2 pages.
Mehta, Ashish, Ganesamoorthi, Sai, and Wojsznis, Willy, Feedforward Neural Networks for Process Identification and Prediction, Neural Network and Expert Systems Presentation, 2001, 9 pages.
Tzovla, Vasiliki and Zhang, Yan, Abnormal Condition Management using Expert Systems, Neural Network and Expert Systems Presentation, 2001, 9 pages.
Patent Cooperation Treaty, International Preliminary Report on Patentability for PCT/US2005/015439, Nov. 7, 2006, 8 pages.
Intellectual Property Office of Great Britian, "Examination Report," issued in connection with counterpart Great Britian application serial No. GB0621081.9, mailed Apr. 30, 2009, 3 pages.
"Examination Report under Section 18(3)," issued by the United Kingdom Intellectual Property Office on Dec. 3, 2009, in connection with British application No. GB0621081.9, 2 pages.
Fisher-Rosemount Systems, Inc., DeltaV Bulk Edit, pp. 1-12, Apr. 2002.
Kopp, John, About.com, C++ Tutorial—Lesson 29: Inheritance, Continued, http://www.cplus.about.com/od/beginnerctutorial/l/aa12050c.htm, downloaded Apr. 27, 2005.
Kopp, John, About.com, C++ Tutorial—Lesson 29: Inheritance, http://cplus.about.com/od/beginnerctutorial/l/aa120502b.htm, downloaded Apr. 27, 2005.
Kopp, John, About.com, C++ Tutorial—Lesson 29: Inheritance Introduction, http://cplus.about.com/od/beginnerctutorial/l/aa120502a.htm, downloaded Apr. 27, 2005.
Kopp, John, About.com, C++ Tutorial—Lesson 17: Classes, Members and Methods, Defining Methods, http://cplus.about.com/od/beginnerctutorial/l/aa070602c.htm, downloaded Apr. 27, 2005.
Kopp, John, About.com, C++ Tutorial—Lesson 17: Classes, Members and Methods, Defining Classes, http://cplus.about.com/od/beginnerctutorial/l/aa070602b.htm, downloaded Apr. 27, 2005.
Kopp, John, About.com, C++ Tutorial—Lesson 17: Classes, Members and Methods, http://cplus.about.com/od/beginnerctutorial/l/aa070602a.htm, downloaded Apr. 27, 2005.
Kopp, John, About.com, C++ Tutorial—Lesson 9: Introduction to Classes, Object Terminology, http://cplus.about.com/od/beginnerctutorial/l/aa041002e.htm, downloaded Apr. 27, 2005.
Kopp, John, About.com, C++ Tutorial—Lesson 9: Introduction to Classes, Using Objects, http://cplus.about.com/od/beginnerctutorial/l/aa041002d.htm, downloaded Apr. 27, 2005.
Kopp, John, About.com, C++ Tutorial—Lesson 9: Introduction to Classes, Defining Classes, htpp://cplus.about.com/od/beginnerctutorial/l/aa041002b.htm, downloaded Apr. 27, 2005.
Patent Cooperation Treaty, International Search Report and Written Opinion of the International Searching Authority for PCT/US2005/015596, Apr. 5, 2006, 12 pages.
Sangyong Han et al., Web Based rSPC (realtime Statistical Process Control) System Supporting XML Protocol, Industrial Electronics, Jun. 2001, pp. 399-403, Piscataway, New Jersey.
Patent Cooperation Treaty, International Search Report and Written Opinion of the International Searching Authority for PCT/US2005/015439, Aug. 10, 2005, 12 pages.
Patent Cooperation Treaty, International Search Report and Written Opinion of the International Searching Authority for PCT/US2005/015394, Mar. 20, 2006, 15 pages.
D. Chen, Real-Time Management in the Distributed Environment, Ph.D. Thesis, 1999.
Patent Cooperation Treaty, International Search Report and Written Opinion of the International Searching Authority for PCT/US2005/015585, May 9, 2006, 14 pages.
developers.sun.com, Core J2EE Patterns—Data Access Object, http://web.archive.org/web/20040414043406/java.sun.com/blueprints/corej2eepatterns/Patterns/DataAccessObject.html, Apr. 14, 2006, 10 pages.
Mohr S et al, BizTalk and Application Integration—Translating Between Message Specification: BizTalk Mapper, Professional BizTalk, Apr. 14, 2001, 3 pages.
W3C, XSL Transformations (XSLT), Version 1.0, W3C Recommendation, Nov. 16, 1999, 11 pages.
Nixon, Mark et al., U.S. Appl. No. 10/575,173, filed Apr. 7, 2006 for "Graphic Display Configuration Framework for United Process Control System Interface."
English Language "The Notification of the Fourth Office Action," issued by the State Intellectual Property Office of P.R. China, in connection with Chinese Application No. 200580014271.1, on Dec. 27, 2010, 9 pages.

(56) References Cited

OTHER PUBLICATIONS

Chinese Language, "The Notification of the Fourth Office Action," issued by the State Intellectual Property Office of P.R. China, in connection with Chinese Application No. 200580014271.1, on Dec. 27, 2010, 5 pages.

Notice of Reasons for Rejection, issued by the Japanese Patent Office in connection with Japanese application No. 2007-511530, on Dec. 7, 2010, 3 pages.

Akao Nekota, "Super Fundamental Programming from Square One for Visual Basic 6.0 Shoeisha," Nov. 1, 2002, vol. 8, No. 20, pp. 181-189.

Ishikawa Tatsuya, "Exploring Structures of Windows That You Think You Know but Really Don't," Nikkei Software, Japan, Nikkei Business Publications, Inc., Nov. 24, 1999, vol. 2, No. 13, pp. 66-75.

English Abstract of Japanese Publication No. 05053641, 1 page.

"Notice of Reasons for Rejection," issued by the Japanese Intellectual Property Office in connection with Japanese Application No. 2007-511530, on Nov. 8, 2011, 2 pages.

Decision of Rejection, issued by the State Intellectual Property Office of P.R. China, in connection with Chinese Patent Application No. 200580014283.4, on Aug. 3, 2012, 6 pages.

English Translation of "Notice of Reasons for Rejection," issued by the Japanese Intellectual Property Office in connection with Japanese Patent Application No. 2011-132273, on Nov. 20, 2012, 5 pages.

"Notice of Reasons for Rejection," issued by the Japanese Intellectual Property Office in connection with Japanese Patent Application No. 2011-132273, on Nov. 20, 2012, 5 pages.

State Intellectual Property Office of P.R. China, "First Office Action," Mar. 21, 2008, 19 pages, Beijing, P.R. China.

\* cited by examiner

INTEGRATED GRAPHICAL RUNTIME INTERFACE FOR PROCESS CONTROL SYSTEMS

RELATED APPLICATION

This patent is a continuation of International Application Serial Number PCT/US2005/015439, entitled "Integrated Graphical Runtime Interface for Process Control Systems" filed on May 4, 2005, which claims the benefit of provisional U.S. Patent Application No. 60/567,980, filed May 4, 2004, which is hereby incorporated by reference herein in its entirety.

FIELD OF THE DISCLOSURE

The present invention relates generally to process control systems and, more specifically, to an integrated graphical runtime interface for process control systems.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine, and then generate control signals that are sent over the buses or other communication lines to the field devices to control the operation of the process. In this manner, the process controllers may execute and coordinate control strategies using the field devices via the busses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process, etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

Process control systems typically provide one or more operator terminals and/or application stations including one or more graphical interfaces to enable system operators to view current process-related parameters, statistical and/or historical process information, alarm information, campaign management and/or execution information or, more generally, information provided by any or all of the applications associated with the process control system.

With some known process control systems, one or more of the process control-related applications include user interface functionality to enable the application(s) to interact directly with, for example, an operating system (e.g., a Windows-based operating system) of an operator station or terminal providing a graphical interface to the process control system. Thus, in these cases, the various applications and, in particular, the graphical user interface portions thereof interact directly and independently (i.e., independent of the other applications) with the operating system of the operator station. As a result, the system operators are responsible for managing and/or coordinating the use of a number of graphical displays (e.g., display windows) rendered via a display device (e.g., a video monitor or other display device) of the operator station. The management of these relatively independent displays or windows is complicated by the fact that each of the displays may provide a different type of information (e.g., graphical, textual, trends, alarms, etc.) at different times. For example, some information may be best displayed in the form of a banner placed at the top or bottom of a display device (e.g., a video monitor), other information may be best displayed in a relatively large central display area, and still other information may be best displayed in the form of a temporary pop-up floating display or window.

In some cases, the display management duties imposed on the system operator may include arranging, sizing, and/or scaling the various display windows to fit within the form factor of a particular display platform (e.g., a workstation or personal computer monitor, a personal data assistant, a smart phone, tablet personal computer, etc.). Further, even if a system operator is able to configure and organize the independent graphical displays in a useful manner for a given set of process control information provided by a particular group of applications, adding and/or changing the information displayed may require time consuming reorganization or reconfiguration of the display. For example, if the system operator desires to add alarm information to a display that is currently not displaying alarm information, the entire display may have to be reorganized by moving, resizing, and/or eliminating one or more of the current displays and/or windows to fit within the form factor of the display.

Another difficulty resulting from requiring system operators to organize and/or manage the layout and operation of the graphical user interface is that each of a plurality of displays, which may be associated with a respective plurality of operator and/or application stations distributed throughout the process control system, may use a different combination and layout of graphical views or displays. This lack of a common display framework leads to inconsistency across the various displays used in the process control system, thereby reducing the intuitiveness and/or proficiency with which an operator interacts with the various displays and complicates the training of new system operators and/or other personnel.

Additionally, because many known graphical user interfaces are not integrated within a common runtime environment and enable system operators to interact directly with the operating system, system operators can purposefully and/or inadvertently disable one or more vital runtime graphical user interfaces. For example, with such direct access to the operating system underlying a graphical interface that provides alarm information, a system user could potentially disable the reporting of alarm information, which may result in the failure to respond to an unacceptable and/or dangerous condition within a plant.

SUMMARY

In one example, a method and apparatus for displaying process control information via a graphical user interface instantiates a runtime workspace application to operatively interpose between an operator station operating system and an operator. The example method and apparatus also displays a plurality of panels via the graphical user interface and displays a portion of the process control information associated with a runtime application in at least one of the plurality of panels via the runtime workspace application.

Another example method and apparatus for displaying process control information via a graphical user interface establishes a workspace framework having a plurality of display panels, assigns display category information to each of the display panels, and assigns a category to process control information to be displayed. The example method and apparatus also compares the category assigned to the process control information to be displayed to the category information assigned to the display panels and selects one of the display panels to display the process control information to be displayed based on the comparison.

DETAILED DESCRIPTION

Figure 1:
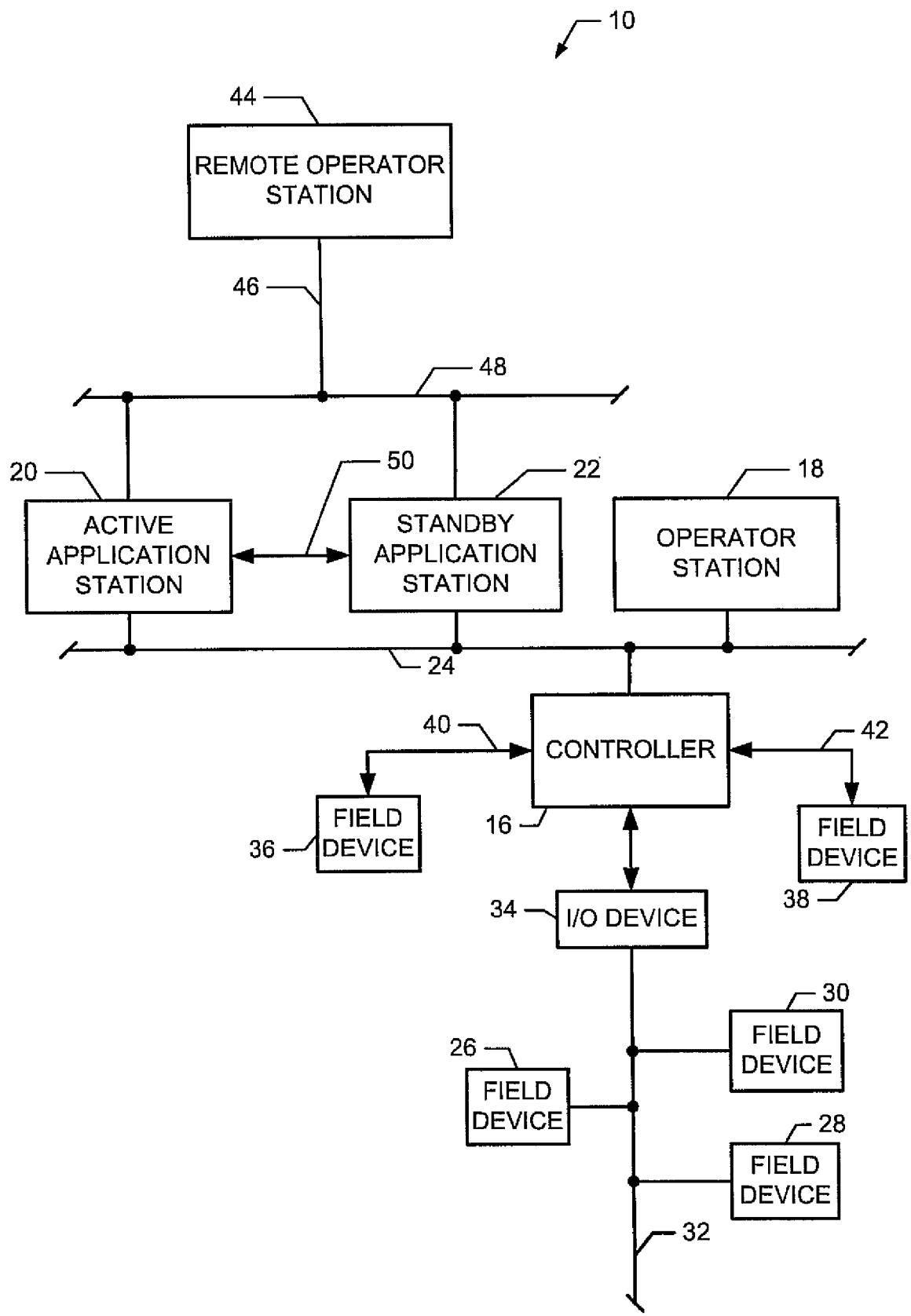
FIG. 1 is a block diagram of an example process control system that uses the integrated graphical runtime interface described herein.

In general, the example apparatus, methods, and articles of manufacture described herein may be used within a process control system to provide a highly integrated graphical user interface environment for use by a variety of personnel associated with the configuration and/or operation of a process control system. More specifically, the example integrated graphical user interface described herein may be used to host one or more process control applications such as, for example, process monitoring applications, alarm management applications, process trending and/or history applications, batch processing and/or campaign management applications, streaming video applications, advanced control applications, etc. More generally, the example integrated graphical user interface described herein may be used to host applications associated with the development, deployment, configuration, design, customization, operation, maintenance, and/or support of a process control system. Personnel such as, for example, information technology personnel, configuration engineers, system operators, technical support engineers, software development engineers, test engineers, etc. may utilize various aspects of the example integrated graphical user interface described herein to perform their duties.

In contrast to some known graphical user interfaces for process control systems, the example integrated graphical user interface described herein may be used to aggregate and coordinate the graphical user interface functionality or operations of multiple applications. In particular, as described in greater detail below, the example graphical user interface may provide predefined display layouts or templates composed of a display area having one or more display panels or areas. Some of the display panels may be fixed in place relative to the overall display area, some panels may be stacked on other panels, and still other panels may be floating or pop-up panels that appear temporarily over one or more other panels (i.e., occluding partially or completely the one or more other panels). Certain panels may be assigned to receive information for rendering or display from one or more particular applications. Alternatively or additionally, one or more applications may send process control-related information to be rendered or displayed to the example integrated graphical interface together with information specifying within which panel(s) the information may be or must be displayed. In this manner, the example integrated graphical user interface can automatically manage the display (e.g., the layout, scaling, etc.) of information from one or more process control-related applications within a unified display space or workspace, thereby reducing or minimizing the display management duties of system operators and/or other personnel associated with the process control system. The automatic management of display information may include automatic adjustment or adaptation of displayed information in a manner that best renders or displays the information on a particular hardware/software platform having a particular display device size, configuration, capabilities, etc.

In addition to minimizing display management duties of system operators and/or other personnel associated with the process control system, the automatic display management functions performed by the example integrated graphical user interface described herein can result in more consistent display scenarios and, thus, can improve the intuitiveness of the displays, simplify training, reduce operator errors (particularly in high stress process control situations or environments), etc. For example, the integrated graphical user interface described herein may be configured to provide substantially consistent visual elements (e.g., display panel geometries, placements, sizes, use assignments or conventions, etc.) for some or all of the runtime applications managed by the integrated graphical user interface.

In further contrast to some known graphical runtime interfaces for process control systems, the example integrated graphical runtime interface described herein may be configured to operatively interpose between the runtime applications it manages and an underlying operating system of the operator workstation. More specifically, the example graphical runtime interface described herein is different from some known windows-type applications in that example graphical runtime interface utilizes a runtime workspace application that operatively interposes between users (e.g., system operators and/or other personnel) and the underlying operating system. In other words, the runtime workspace application may operate to encapsulate runtime application(s) so that the user is insulated/prevented from interacting directly with the underlying operating system and/or other applications. For example, the runtime workspace application employed by the example integrated graphical user interface described herein may intercept and/or trap certain key sequences, commands, etc. issued by the user.

Thus, the runtime workspace application used by the example integrated graphical runtime interface described herein may be employed to prevent users from inadvertently (or purposefully) damaging applications or data, gaining access to applications with which they are not authorized to interact, or carrying out any other actions that could potentially compromise the operation of the process control system. For example, the example integrated graphical runtime interface described herein may encapsulate the runtime applications with which a user interacts to prevent the user from closing one or more of the applications, interrupting or otherwise disrupting the execution of the applications via commands directed to the operating system underlying the runtime applications, etc.

As described in greater detail below, the runtime workspace used by the example integrated graphical runtime interface describe herein provides a reliable, robust environment in which runtime applications (e.g., user interface applications and/or any other applications) can be sited, and provides a secure environment for executing runtime applications by preventing users from compromising the operation the runtime applications or damaging the data associated therewith.

Now turning to FIG. 1, a block diagram of an example process control system 10 that uses the example integrated graphical runtime interface described herein is shown. As depicted in FIG. 1, the process control system 10 includes a controller 16, an operator station 18, an active application station 20 and a standby application station 22, all of which may be communicatively coupled via a bus or local area network (LAN) 24, which is commonly referred to as an application control network (ACN). The operator station 18 and the application stations 20 and 22 may be implemented using one or more workstations or any other suitable computer systems or processing units. For example, the application stations 20 and 22 could be implemented using single processor personal computers similar to an example processor system 1102 shown in FIG. 11 below, single or multi-processor workstations, etc. In addition, the LAN 24 may be implemented using any desired communication medium and protocol. For example, the LAN 24 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the application stations 20 and 22 may be used to provide redundant communication paths between the operator station 18, the application stations 20 and 22, and the controller 16.

The controller 16 may be coupled to a plurality of smart field devices 26, 28 and 30 via a digital data bus 32 and an input/output (I/O) device 34. The smart field devices 26-30 may be Fieldbus compliant valves, actuators, sensors, etc., in which case the smart field devices 26-30 communicate via the digital data bus 32 using the well-known Fieldbus protocol. Of course, other types of smart field devices and communication protocols could be used instead. For example, the smart field devices 26-30 could instead be Profibus or HART compliant devices that communicate via the data bus 32 using the well-known Profibus and HART communication protocols. Additional I/O devices (similar or identical to the I/O device 34) may be coupled to the controller 16 to enable additional groups of smart field devices, which may be Fieldbus devices, HART devices, etc., to communicate with the controller 16.

In addition to the smart field devices 26-30, one or more non-smart field devices 36 and 38 may be communicatively coupled to the controller 16. The non-smart field devices 36 and 38 may be, for example, conventional 4-20 milliamp (mA) or 0-10 volts direct current (VDC) devices that communicate with the controller 16 via respective hardwired links 40 and 42.

The controller 16 may be, for example, a DeltaV™ controller sold by Emerson Process Management, LLLP. However, any other controller could be used instead. Further, while only one controller is shown in FIG. 1, additional controllers of any desired type or combination of types could be coupled to the LAN 24. The controller 16 may perform one or more process control routines associated with the process control system 10. Such process control routines may be generated by a system engineer or other system operator using the operator station 18 and downloaded to and instantiated in the controller 16.

As depicted in FIG. 1, the example process control system 10 may also include a remote operator station 44 that is communicatively coupled via a communication link 46 and a LAN 48 to the application stations 20 and 22. The remote operator station 44 may be geographically remotely located, in which case the communication link 46 is preferably, but not necessarily, a wireless communication link, an internet-based or other packet-switched communication network, telephone lines (e.g., digital subscriber lines), or any combination thereof.

As depicted in the example of FIG. 1, the active application station 20 and the standby application station 22 are communicatively coupled via the LAN 24 and via a redundancy link 50. The redundancy link 50 may be a separate, dedicated (i.e., not shared) communication link between the active application station 20 and the standby application station 22. The redundancy link 50 may, for example, be implemented using a dedicated Ethernet link (e.g., dedicated Ethernet cards in each of the application stations 20 and 22 that are coupled to each other). However, in other examples, the redundancy link 50 could be implemented using the LAN 24 or a redundant LAN (not shown), neither of which is necessarily dedicated, that is communicatively coupled to the application stations 20 and 22.

Generally speaking, the application stations 20 and 22 continuously, by exception, or periodically, exchange information (e.g., in response to parameter value changes, application station configuration changes, etc.) via the redundancy link 50 to establish and maintain a redundancy context. The redundancy context enables a seamless or bumpless handoff or switchover of control between the active application station 20 and the standby application station 22. For example, the redundancy context enables a control handoff or switchover from the active application station 20 to the standby application station 22 to be made in response to a hardware or software failure within the active application station 20 or in response to a directive from a system operator or user or a client application of the process control system 10.

Figure 2:
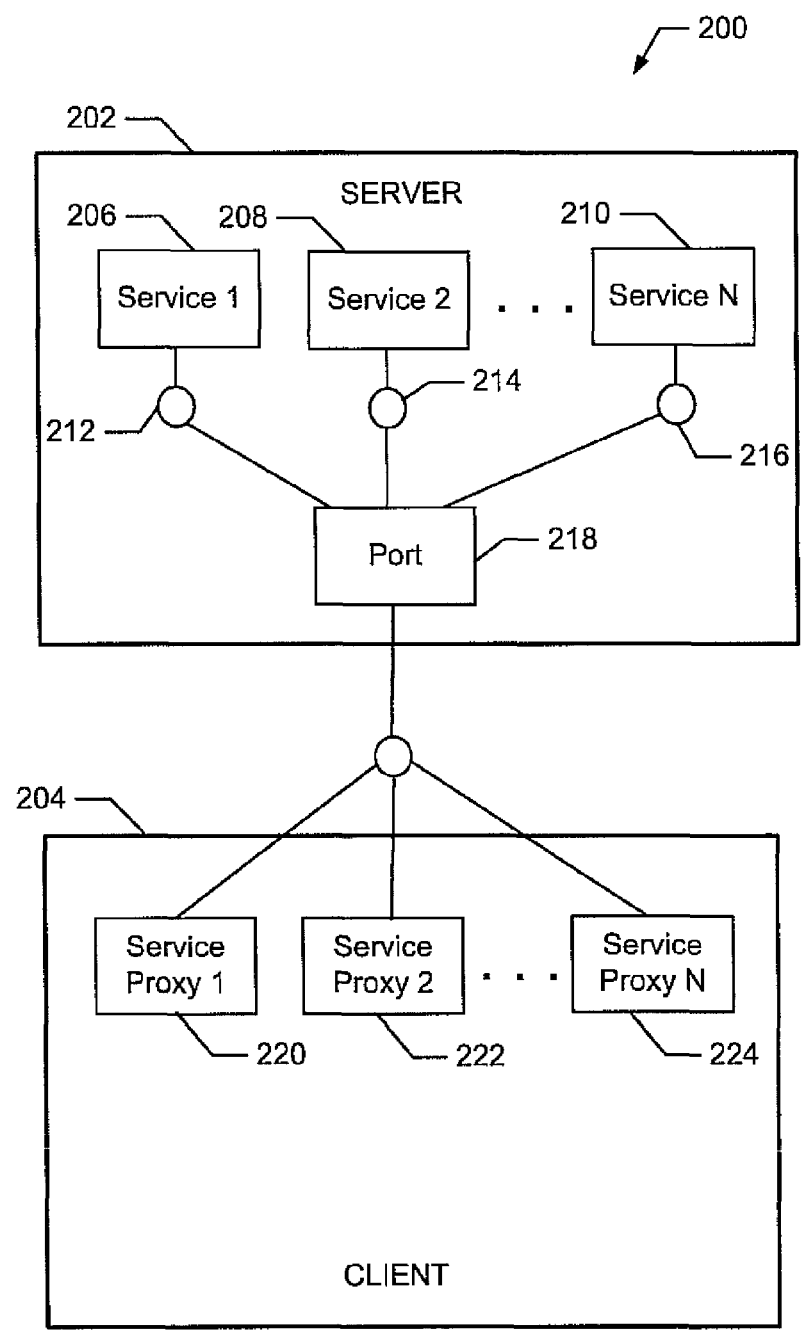
FIG. 2 is a block diagram depicting an example service-oriented architecture or structure 200 that may be used within the example process control system of FIG. 1 to implement the integrated graphical runtime interface described herein.

FIG. 2 is a block diagram depicting an example service-oriented architecture or structure 200 that may be used within the example process control system 10 of FIG. 1 to implement the integrated graphical runtime interface described herein. Thus, before further describing the example integrated graphical runtime interface, a discussion of the example service-oriented architecture 200 is provided below.

Turning in detail to FIG. 2, the example service-oriented architecture 200 includes a server 202 and a client 204. The server 202 includes a plurality or collection of services 206, 208, and 210, some or all of which may perform related functions. The services 206, 208, and 210 provide respective interfaces (e.g., one or more sets of exposed parameters) 212, 214, and 216 that enable communication with the client 204 via a communication port 218. The service interfaces 212, 214, and 216 are substantially generic in nature and, thus, are substantially independent of the schemas (i.e., data format, protocol, etc.) used for the data contained in configuration and/or runtime databases associated with the example process control system 10 of FIG. 1. As a result, the service interfaces 212, 214, and 216 only require modification (e.g., updating) if new service capabilities (e.g., functions) are added to one or more of the services 206, 208, and 210. Thus, the service interfaces 212, 214, and 216 do not have to be changed if new data objects are added for use within the process control system 10 (FIG. 1).

The server 202 may be implemented as software executed on a processor-based system such as, for example, one or more of the application stations 20 and 22 and/or operator stations 18 and 44 shown in the example system 10 of FIG. 1. Of course, the server 202 may be implemented using any other processor-based system or workstation coupled to the example process control system 10 (FIG. 1).

The client 204 includes a plurality of service interface proxies 220, 222, and 224, each of which corresponds to one of the services 206, 208, and 210. The number of service interface proxies used by the client 204 may be fewer than the number of services provided by the server 202. In other words, the client 204 preferably creates proxies only for the services to which it requires access. Thus, the client 204 may generate one or more proxies as needed to access or interact with one or more of the services 206, 208, and 210 provided by the server 202.

Similar to the server 202, the client 204 may be implemented as software executed on a processor-based system such as, for example, one or more of the application stations 20 and 22 and/or one or more of the operator stations 18 and 44. In one example implementation, the client 204 may utilize a web browser framework (e.g., Internet Explorer) or the like to access one or more of the services 206, 208, and 210 provided by the server 202. However, any other desired software framework may be used instead of or in addition to such a web browser framework. More generally, the client 204 may represent any desired application within the example process control system 10 (FIG. 1). Thus, the client 204 may, for example, be a configuration application, a maintenance application, a monitoring application, a process control application, and/or any other application or combination of applications. As described in greater detail in connection with FIGS. 3 and 4 below, the client 204 (i.e., the client application(s)) may include display functionality (e.g., graphical user interface functionality) to enable one or more system operators, engineers, and/or any other users to view and/or change process control data during configuration operations, runtime, etc.

While the example architecture 200 of FIG. 2 depicts a single server in communication with a single client, additional servers and clients may be used if desired. For example, in some implementations, the client 204 may communicate with, interoperate with, and/or access services in more than one server. Likewise, in these implementations or other implementations, the example server 202 (or other individual servers) may communicate with and/or interoperate with multiple clients.

Thus, with the example service-oriented architecture 200 of FIG. 2, the services 206, 208, and 210 are substantially decoupled (e.g., in terms of data dependencies) from one another and from applications that make use of (e.g., call) the services 206, 208, and 210. Such decoupling advantageously enables the software associated with each of the services 206, 208, and 210 to be independently modified or versioned and released for field use without having to modify or version the application(s) that are utilized by the client 204 and which access the services 206, 208, and 210. Likewise, the application(s) associated with the client 204 may be independently modified or versioned without having to modify or version the services 206, 208, and 210, as long as the application(s) associated with the client 204 adhere to or are compatible with the interfaces 212, 214, and 216 of the respective services 206, 208, and 210. Thus, instead of statically defining relationships between the applications associated with the client 204 and one or more of the services 206, 208, and 210 by fixing such relationships (i.e., creating data dependencies) at the time the software associated with the applications and/or the services 206, 208, and 210 is generated, the example architecture 200 of FIG. 2 allows such relationships to be established dynamically at runtime. Further details relating to the example service-oriented architecture described above may be found in International Patent Application No. PCT/US05/15394, entitled "Service-Oriented Architecture for use with Process Control Systems," filed on May 4, 2005, the entire disclosure of which is incorporated by reference herein.

Figure 3:
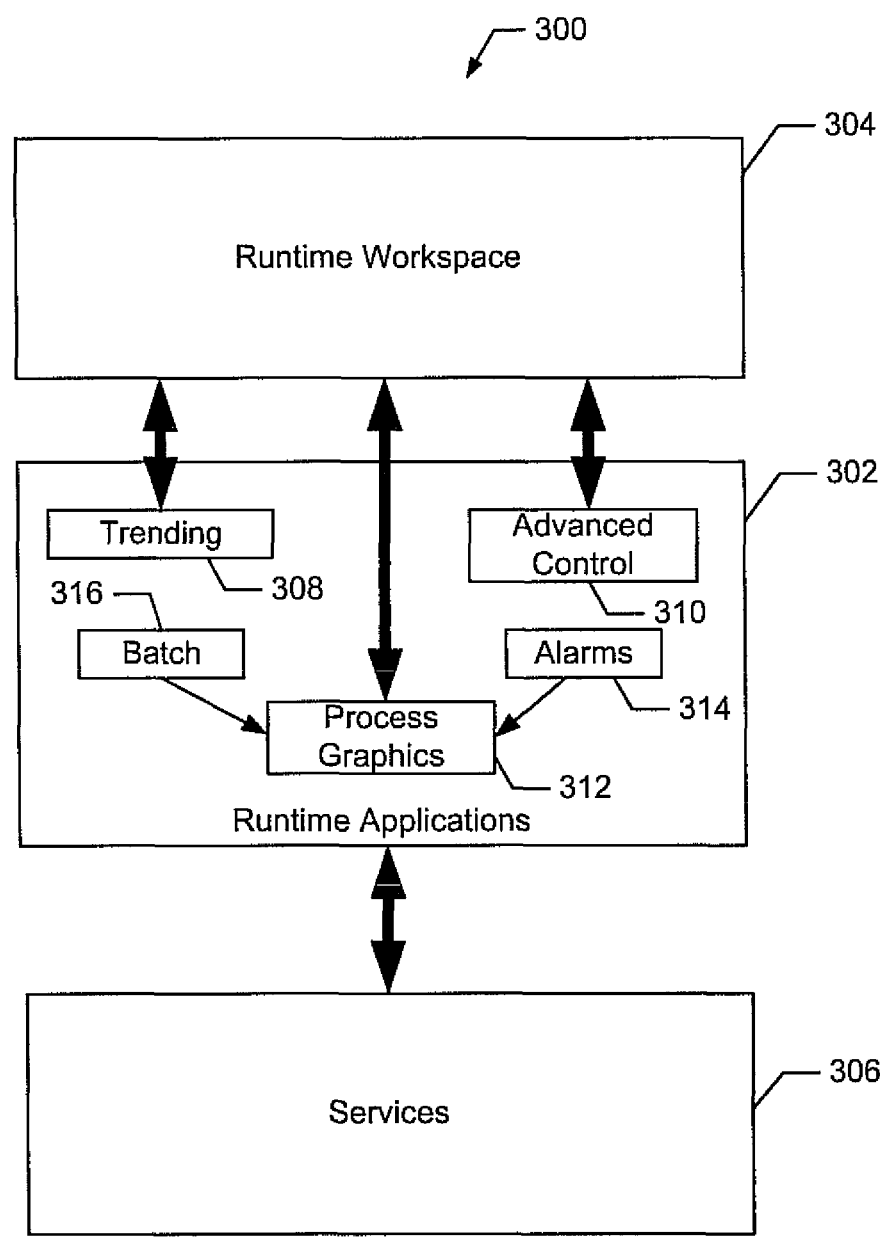
FIG. 3 is a block diagram depicting the relationship between runtime applications, services, and the example integrated graphical runtime interface described herein.

FIG. 3 is a block diagram depicting an example graphical runtime interface 300. As shown in FIG. 3, a plurality of runtime applications 302 are communicatively or operatively coupled to a runtime workspace 304 and a collection of services 306. More specifically, the runtime applications 302 and the services 306 may be operatively or communicatively coupled using the example service-oriented architecture 200 (FIG. 2). In that case, the services 306 (e.g., the services 206, 208, and 210) may be provided by one or more servers or other processing system(s) (e.g., the sever 202). Additionally, the services 306 may include database services that provide process control-related information, history services that provide historical information related to the process control system 10 (FIG. 1), alarms and/or events services, and/or any other services accessed or used by the process control system 10 (FIG. 1). Further, the runtime applications 302 may be provided via one or more clients (e.g., the client 204 of FIG. 2) and, thus, may be communicatively or operatively coupled to the services 306 via proxies (e.g., the proxies 220, 222, and 224). In the example of FIG. 3, the runtime applications 302 include a trending application 308, an advanced control application 310, and a process graphics application 312, which receives information from a batch application 316 and/or an alarms (and/or events) application 314. However, one or more additional or different applications from those specifically depicted in FIG. 3 may be used instead. For example, campaign management applications, streaming video applications, and/or any other applications associated with the development, deployment, configuration, design, customization, operation, maintenance, and/or support of a process control system may be used.

In general, graphical displays provided by the runtime applications 302 are sited in or encapsulated by the runtime workspace 304 to provide an integrated runtime display, which may contain information from one or more of the applications 302 at a given time. In particular, the runtime workspace 304 may be configured to automatically arrange, scale, etc. a plurality of panels, each of which may contain information pertaining to a different one of the services 306, within a display to minimize the display (or windows) management duties imposed on system operators and/or other personnel. Such automatic placement, layout, etc. of the display panels results in more consistent display scenarios, thereby improving the intuitiveness of the displays, simplifying training, reducing operator errors, etc.

Also, generally, the runtime workspace 304 enables personnel such as system operators, engineers, etc. to interact with the runtime applications 302 via a graphical user interface provided by the runtime workspace 304 in a safe, robust, and secure manner. More specifically, the runtime workspace 304 may be implemented as software or other machine readable and executable instructions or code that operatively interposes between the runtime applications 302 and an underlying operating system, which may be, for example, a Windows operating system or any other suitable operating system. In this manner, the runtime workspace 304 may be configured to prevent users from interacting directly with underlying applications, including, for example, the underlying operating system. For example, in some example implementations, the runtime workspace 304 may intercept and/or trap certain key sequences, commands, etc. issued by the user.

The runtime workspace 304 may be configured to provide multiple operational modes. One example operational mode provides a dedicated or controlled desktop (e.g., a kiosk type) interface that prevents system administrators, system operators, and/or other personnel from inadvertently or purposefully damaging or compromising applications and/or the data associated with those applications. Another example operational mode for the runtime workspace 304 enables certain designated or authorized users to use the runtime workspace 304 in conjunction with other applications such as, for example, Windows-based applications under substantially less restrictive conditions than provided by the controlled desktop mode mentioned above.

In some examples, the runtime workspace 304 may be implemented using, for example, a server (e.g., the server 202) that is configured to automatically start in the dedicated and controlled desktop mode upon boot-up. In such examples, the runtime workspace 304 may permit only one instance of the runtime workspace 304 to be instantiated within the server. Certain users may have permission or authorization to subsequently cause the runtime workspace 304 to switch to the less restrictive operating mode mentioned above.

The runtime workspace 304 may also provide a reset mechanism that may be used during operation of the runtime workspace 304 to revert to an initial startup condition or configuration without requiring the server on which the runtime workspace 304 is resident and operating to be shut down and restarted. This reset mechanism may be invoked by a system operator to restore the proper operation of the runtime workspace 304 in the event that the runtime workspace 304 is malfunctioning. The initial conditions to which the reset restores the runtime workspace 304 may include initial and/or default display framework contents (e.g., views, panel arrangements, etc.).

While operating in the dedicated and controlled or restricted operational mode, the runtime workspace 304 may be configured to prevent users from instantiating and interacting with impermissible programs or applications. Such impermissible programs or applications may include programs or applications that could compromise the operation of the runtime applications 302 and/or the runtime workspace 304. In examples where the runtime applications 302 and/or the runtime workspace 304 utilize a Windows-based operating system (e.g., Microsoft Windows), the runtime workspace 304 may disable access to the Start dialog (e.g., Windows key and Cntrl-Esc), the Windows taskbar, and Windows desktop shortcuts. Additionally, the runtime workspace 304 may disable access to the Windows keyboard shortcuts including, for example, Run dialog (WinKey+R), Minimize all (WinKey+M), switch to another (non-runtime workspace) application (Alt-tab), OS Explorer (WinKey+E), etc.

The controlled and dedicated operational mode of the runtime workspace 304 may be configured (e.g., by a system configuration specialist) to present users with a list of applications that can be run while in the restrictive controlled and dedicated operational mode. Such a list of applications may include or may be limited to non-runtime workspace applications that do not permit an operator to alter or delete files, launch further unconstrained applications, etc.

The runtime workspace 304 is also configured to prevent users from rendering the runtime workspace 304 inoperative when in the restrictive dedicated and controlled operational mode. To prevent users from rendering the runtime workspace 304 inoperative, the runtime workspace 304 may not allow the termination of the runtime workspace application by, for example, the Alt-F4 or Exit menu items. Additionally, the access to the Windows (e.g., in the case where Windows is the underlying operating system) security dialog is disabled, access to the windows keyboard shortcuts is disabled (e.g., minimize all (WinKey+M), lock workstation (WinKey+L) is disabled, access to the windows display properties dialog is disabled to prevent changes to, for example, the display color, depth and resolution settings, appearance preferences, themes, wallpaper, etc. Still further, the runtime workspace 304 may disable screen savers and any other similar applications that could potentially interrupt otherwise compromise the continuous display of graphic process control information via the runtime workspace 304.

In cases where a web browser or access to a web browser is provided by the runtime workspace 304 such a web browser may permit constrained browsing. For example, only web pages associated with a collection of predetermined, authorized uniform resource locators (URL's) may be displayed or rendered via the runtime workspace 304. Such URL's may include or may be limited to URL's associated with web pages and/or other documents stored on intranet servers.

To ensure that the runtime applications 302 do not compromise the operation of the runtime workspace or each other, the runtime applications 302 are configured to prevent access to operating system (e.g., Windows) folder and file properties (e.g., during the performance of file browsing operations). Nor do the runtime applications 302 permit the properties or security requirements of the file to be changed, unless doing so could not result in damaging or otherwise compromising the software or data installed on that workstation.

As noted above, when operating in the less restrictive operational mode, the runtime workspace 304 can be used in conjunction with other Windows applications by certain authorized personnel. This less restrictive operational mode may be used to enable system configuration personnel to interact with workspace configuration, display configuration, and/or any other configuration applications. Additionally, this less restrictive operational mode may be used to enable users to access debugging features that may only be suitably accessed by the authorized personnel. Still further, this less restrictive operational mode may be used to enable users to troubleshoot the runtime workspace 304.

While operating in the less restrictive operational mode, the runtime workspace 304 enables the authorized users to utilize operating system functions (e.g., Windows functions) including, for example, the task bar, the Start button, the Run dialog, and the like. Additionally, the Windows key and Windows key shortcuts may be used, as can the application minimization function and application switching function (Alt-tab). Still further, the user is provided an unrestricted ability to change display properties and to terminate one or more of the runtime applications 302. Users may also be permitted to switch from the less restrictive operational mode to the more restrictive dedicated and controlled operational mode without having to provide security keys or any other authorization. Upon performing such a switch of operational modes, the runtime workspace 304 retains substantially all or most of the workspace context (e.g., panel content, recently used history, etc.) for rendering in the display provided in the more restrictive operational mode.

The less restrictive operational mode also enables the authorized users to create another operating system (e.g., Windows) application window on the operating system desktop (e.g., the Windows desktop). The additional application window enables user to create new displays including content that may be managed by the users. For example, the additional application window may include content from any of the framework panels composing the runtime workspace 304 and that content may be positioned, sized, scrolled through, minimized, maximized, closed, etc. as desired by the users. Also, for example, an additional application may be used to test or compare multiple different display frameworks (e.g., panel layouts, content configurations, different languages, etc.).

As noted above, the less restrictive operational mode provided by the runtime workspace 304 provides relatively unrestricted access to the Windows desktop, thereby enabling users to run new or additional instances of the runtime workspace application (e.g., the runtime workspace 304). A new or additional instance of the runtime workspace application 304 may be started in the dedicated and controlled (i.e., restricted) operational mode or, alternatively, the less restricted operational mode discussed above. In the case where the new or additional instance is started in the dedicated and controlled operational mode, other applications (i.e., non-runtime applications) may be inaccessible. On the other hand, in the case where the new or additional instance is started in the less restrictive operational mode, the user(s) may be permitted to run multiple instances of the runtime workspace 304.

The example runtime workspace 304 may also be configured to provide alternate language functionality. For example, the runtime workspace 304 may be instantiated to utilize a dominant language (e.g., English), which may be selected by default so that all workspace behaviors and interactions (e.g., messages, menu items, etc.) use that default language. If desired, a user may be permitted to select an alternate language (i.e., a language other than the default language) during the operation of the runtime workspace 304.

Turning again to the runtime applications 302, as noted above, the runtime applications 302 are communicatively coupled to and substantially controlled by the runtime workspace 304. Additionally, the runtime applications 302 may be configured to comply with interface conventions defined by the runtime workspace 304. For example, the runtime applications 302 are configured so that scaling, scrolling, selecting, and other user interface functions are implemented in a consistent manner to provide an integrated look and user experience via the runtime workspace display. Further, as described in greater detail below, each of the applications 302 may be assigned to display in a particular one or set of display panels composing the runtime workspace display. The applications 302 are preferably, but not necessarily, configured to automatically adjust the display information provided to the runtime workspace 304 for the display panel in which the display information will be rendered. For example, in the case where an application recognizes that its content will be displayed in a floating panel (i.e., a display panel that may overlay and/or occlude other panels) the application provides graphic layout information suitable for use in rendering the information within the initial size or configuration of the floating panel. Further discussion relating to the display panels is provided below in connection with FIGS. 5-10.

Figure 4:
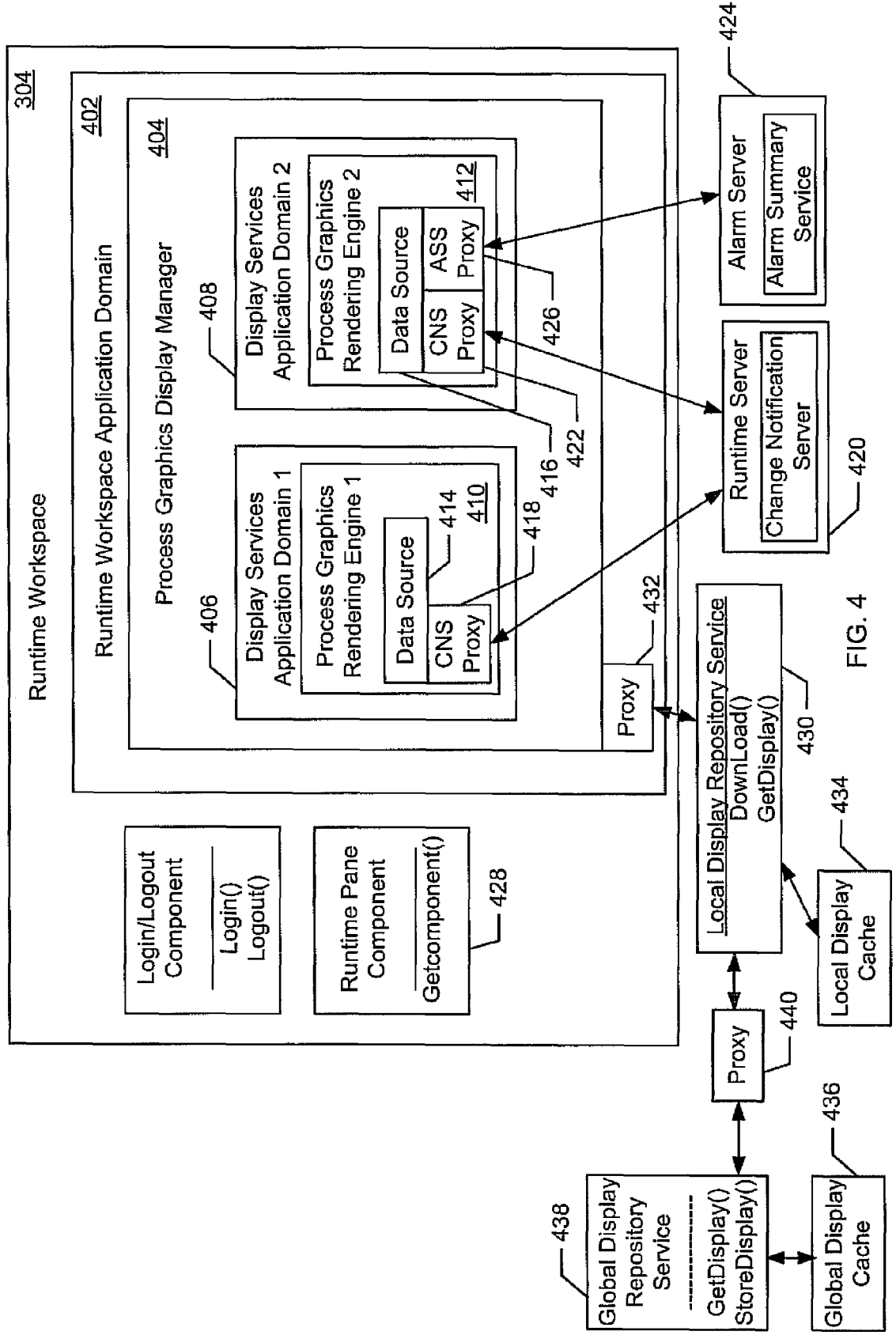
FIG. 4 is a more detailed block diagram of one manner in which the example integrated graphical runtime interface described herein may be used to operatively couple process control graphics to one or more services.

FIG. 4 is a more detailed block diagram of one manner in which the example integrated graphical runtime interface described herein may be used to operatively couple process control graphics to one or more services. As shown in FIG. 4, the runtime workspace 304 includes a runtime workspace application domain 402. Although not shown in FIG. 4, the runtime workspace 304 may host additional application domains, each of which may be associated with a different runtime application and/or service. For example, the trending application 308 and the advanced control application 310 of FIG. 3 may be implemented using different, additional application domains within the runtime workspace 304.

The runtime workspace 304 provides a process graphics display manager 404 that manages the operation of one or more display services 406 and 408, each of which may be associated with respective display panels provided by the runtime workspace 304. The process graphics display manager 404 may be configured to accept requests from the runtime workspace 304 to display a faceplate (e.g., via a pop-up panel such as the floating panel described below in connection with FIG. 5) or another display within the runtime workspace 304 and carries out those requests by calling one or both of the display services 406 and 408. As depicted in FIG. 4, each of the display services 406 and 408 is instantiated in a respective application domain. While two display services 406 and 408 are shown in FIG. 4, more or fewer than two display services may be used instead.

The display services 406 and 408 include respective rendering engines 410 and 412. In this example, the rendering engines 410 and 412 are configured to render process control-related graphics. More specifically, the rendering engines 410 and 412 load display and supporting display control assemblies, which are created or instantiated and then rendered to display panels or panes. The rendering engines 406 and 408 include respective data sources 414 and 416. The data source 414 is communicatively coupled to a runtime server 420, which may provide a change notification service, among other services, via a proxy 418. Similarly, the data source 416 may be communicatively coupled to the runtime server 420 via a proxy 422 and may also be communicatively coupled to an alarm server 424, which may provide an alarm summary service among other services, via a proxy 426.

In operation, the display services 406 and 408 are created or instantiated by the process graphics manager 404 and then registered with the services 420 and 424, respectively. The process graphics manager 404 may then communicate with a runtime pane component 428, which is part of the runtime workspace 304, to obtain the context or handle associated with the display panel(s) in which the display services 406 and 408 are to render their respective displays. Thus, the runtime pane component 428 is configured to create the panel in which the display(s) are to be rendered.

As shown in FIG. 4, the process graphics display manager 404 is communicatively coupled to a local display repository service 430 via a proxy 432. The local display repository service 430 is configured to retrieve display information from a local display cache 434 or, if the needed display information is not stored in the local display cache 434, then from a global display cache 436 via a global display repository service 438 and proxy 444. The local display repository service 430 may be instantiated within the local operator's station (e.g., the same station or server that hosts the runtime workspace 304) and the global display repository service 438 may be instantiated in another node (e.g., a different workstation or server than the station or server in which the runtime workspace 304 is instantiated).

Figure 5:
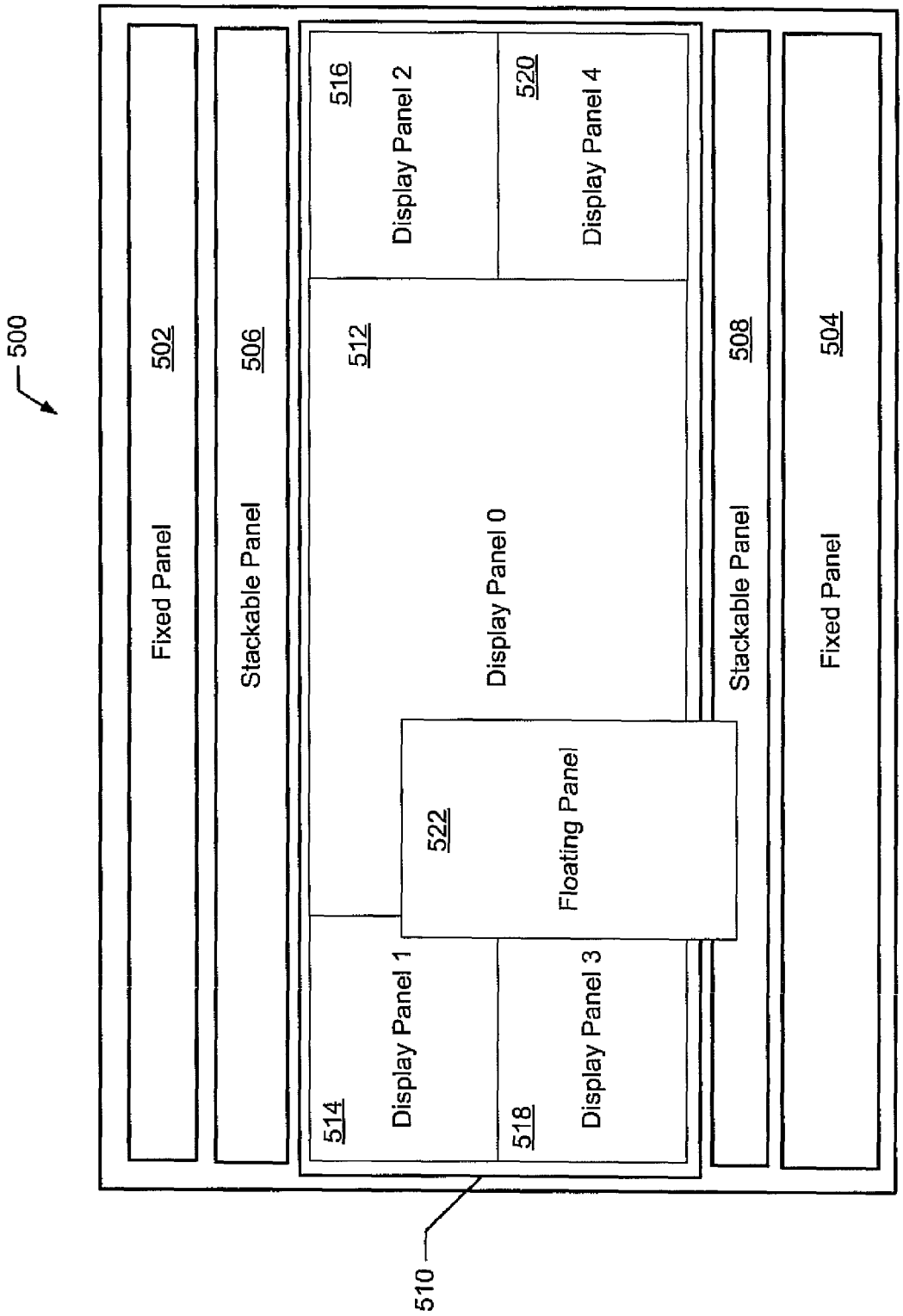
FIG. 5 is an example display framework that may be used by the example integrated graphical runtime interface described herein.

FIG. 5 is an example display framework 500 that may be used by the example integrated graphical runtime interface described herein. In general, the workspace framework 500 provides a user-configurable display layout that may be composed of a plurality of display panels, each of which may contain graphic information pertaining to a different runtime application. In this manner, the display framework 500 provides a highly integrated graphical user interface with which a system operator and/or any other personnel associated with the process control system can interact to view and/or change process control-related information. Once configured, the display layout (i.e., the arrangement of panels, the selection of the types of panels, the association or assignment of runtime applications to particular panels, etc.) may be proliferated throughout the process control system to increase the intuitiveness of users' interactions with the user interface, thereby reducing training time, minimizing mistakes or operator errors, etc.

Also, generally, the display panels composing the framework 500 may be fixed panels or floating panels. Fixed panels are always visible regardless of whether they have content, have a substantially fixed location within the framework 500, and do not overlap other panels. Thus, the fixed panels within the framework 500 effectively form a background surface of an instance of the runtime workspace 304 (FIG. 3). However, as described in greater detail below, some fixed panels may be movable (or the contents thereof may be copied) to locations occupied by other fixed panels.

In contrast, floating panels provide a temporary content window that may float over, overlap, totally or partially occlude, or otherwise interfere with the viewing of one or more fixed panels or other floating panels. Floating panels may be used to display, for example, a process control-related faceplate, runtime application user-specific interface components, etc. Additionally, as described in greater detail below, floating panels may be configured to be movable within the framework 500 to enable a system operator to view panels or portions thereof that may be occluded by the floating panels. Unlike fixed panels, floating panels can be closed by the system operator when viewing of the content of the floating panel is no longer needed or desired.

Turning in detail to the workspace framework 500 of FIG. 5, the upper and lower portions of the framework 500 are bordered by fixed panels 502 and 504. The fixed panels 502 and 504 have an elongate rectangular shape and, thus, may be well-suited for displaying alarm information (e.g., alarm banners), selection areas for selecting actions, operations, etc., status information banners (e.g., process control area status banners), or any other process control-related information. The workspace 500 also includes stackable panels 506 and 508, which are similar to the fixed panels 502 and 504 except that the stackable panels 506 and 508 are layered on the fixed panels 502 and 504. Like the fixed panels 502 and 504, the stackable panels 506 and 508 may be used to display alarm information, status information, toolbars, etc.

The workspace 500 also includes a central display area 510 that is composed of a plurality of display panels 512, 514, 516, 518, and 520. Each of the panels 512-520 may contain content from different runtime time applications. Alternatively or additionally, some or all of the panels 512-520 may contain information relating to different types of information provided by a single runtime application. For example, each of the panels 512-520 may contain process control information relating to different areas or portions of a single process control plant. Further, some or all of the panels 512-520 may contain information pertaining to live process control information and may enable users to manipulate process parameters and the like. Alternatively or additionally, one or more of the panels 512-520 may contain process control plant-related documentation, which may be annotated with live process control information.

The example workspace 500 also includes a floating panel 522, which in this example is overlapping the panels 508, 512, 514, and 518. The floating panel 522 may include content such as, for example, pop-up dialogs, faceplates, etc.

The number, types, and arrangement of panels composing the example workspace 500 of FIG. 5 is only one example and, thus, any other combination and/or arrangement of panels could be used instead. Further, although the example runtime workspace 500 and the panels 502-522 composing the workspace 500 are depicted as having a rectangular geometry, any other geometry or combination of geometries could be used instead of or in addition to those depicted in the example of FIG. 5.

Figure 6:
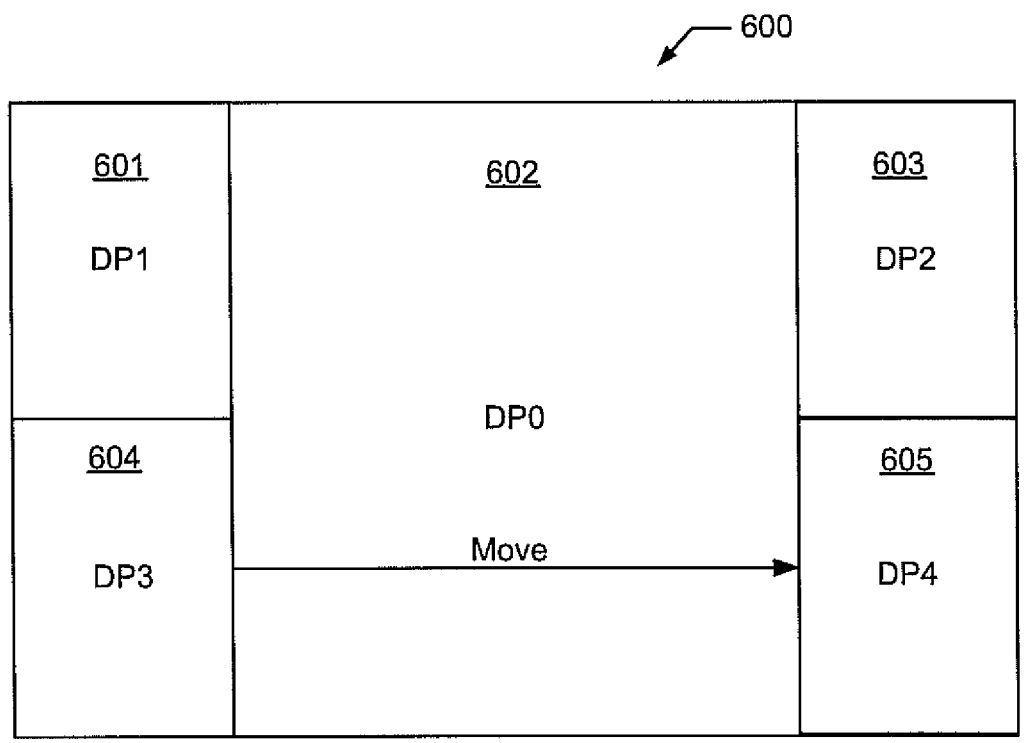
FIGS. 6 and 7 depict an example manner in which one or more display panels may be moved within a display generated by the example integrated graphical runtime interface described herein.
Figure 7:
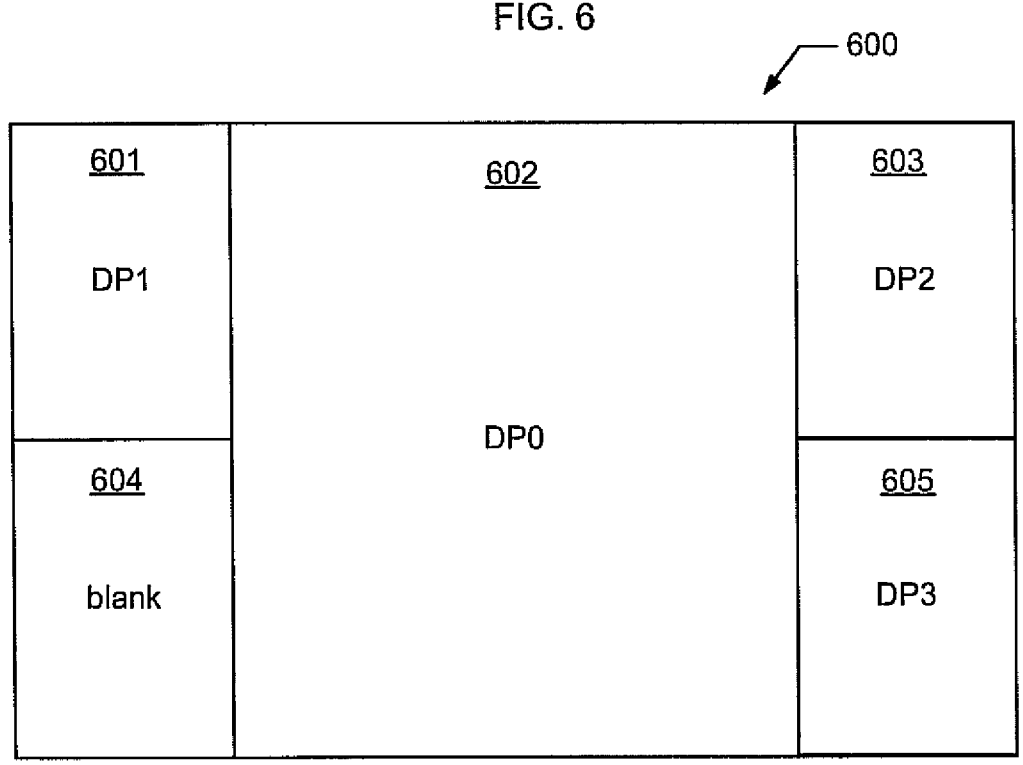

FIGS. 6 and 7 depict an example manner in which one or more display panels may be moved within a display generated by the example integrated graphical runtime interface described herein. More specifically FIG. 6 depicts a display area 600 (similar to the display area 510 of FIG. 5) composed of display areas 601, 602, 603, 604, and 605, which correspond to respective display panels DP1, DP0, DP2, DP3, and DP4. If desired, a system operator or other user may select (e.g., using a mouse or other pointing device) and move the display panel DP3 to reside at the location of the display area 605. After the display panel DP3 has been moved to the location 605, the previous location occupied by the display area 604 may be blank or empty. Of course, any of the panels DP0, DP1, DP2, DP3, and DP4 could be moved to reside in the location of any other panel.

Figure 8:
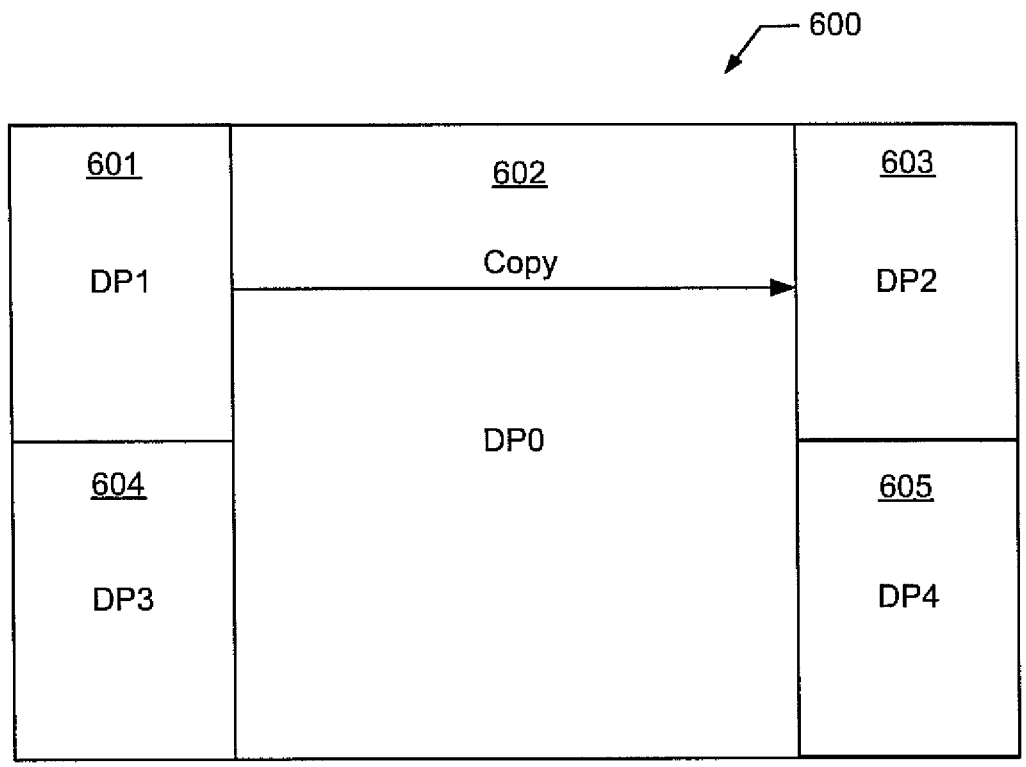
FIGS. 8 and 9 depict an example manner in which one or more display panels may be copied within a display generated by the example integrated graphical runtime interface described herein.
Figure 9:
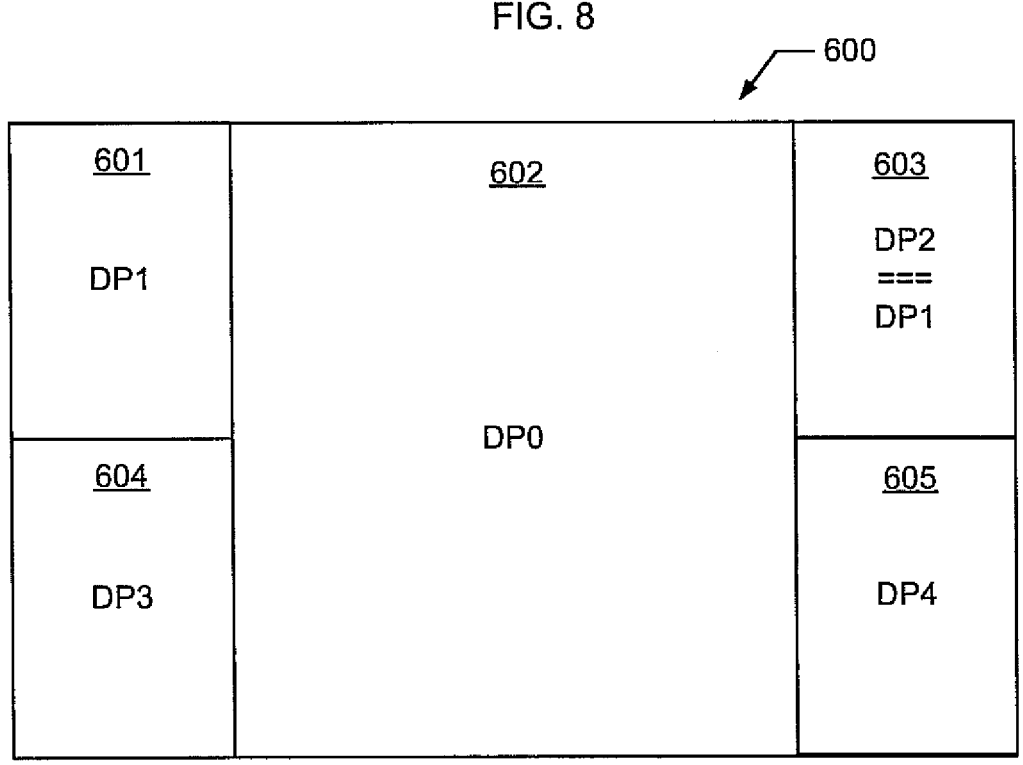

FIGS. 8 and 9 depict an example manner in which one or more display panels may be copied within a display generated by the example integrated graphical runtime interface described herein. As shown in FIG. 8, a system operator or other user may elect to copy the display panel DP1 to the display panel DP2. Following the copy operation as shown in FIG. 9, the display panels DP1 and DP2 share the display panel location 603 and the display panel DP1 also remains in its original location.

Figure 10:
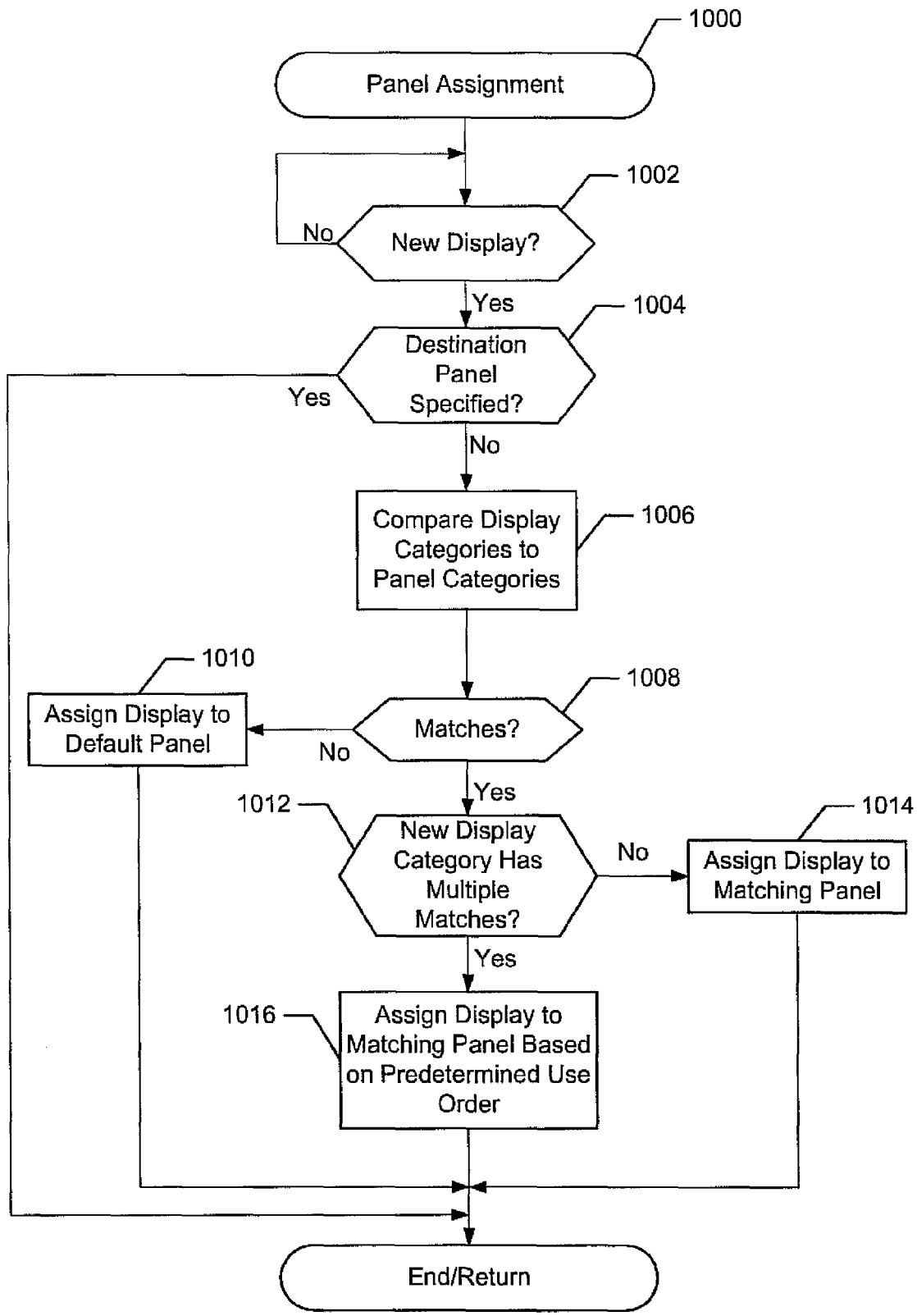
FIG. 10 is an example display panel assignment process that may be used by the example integrated graphical runtime interface described herein.

FIG. 10 is an example display panel assignment process 1000 that may be used by the example integrated graphical runtime interface described herein. Before discussing the example process 1000 in detail, a brief discussion relating to the manner in which workspace display definitions may be configured to enable the operation of the panel assignment process 1000 is provided below.

In general, each of the panels to be used within a workspace framework (e.g., the workspace framework 500 of FIG. 5) may be configured to be associated with one or more display category names (e.g., content categories). For example, returning to the example of FIG. 5, the display panel 512 may be configured to be associated with live process control data and historical process control data, and the display panel 502 may be configured to be associated with only alarm or event data. Likewise, each of the remaining panels 504, 506, 508, 514, 516, 518, 520, and 522 may also be configured to be associated with one or more display or content categories. Further, one of the panels 502-522 shown in the example framework 500 of FIG. 5 may be designated as a default panel which, as described below, may be used to render display information for which other destination identifying information is not available.

Additionally, each of the panels 502-522 is associated with identifying destination or location information and a use precedence. The destination or location information corresponds to a physical location within the workspace display at which information for that panel should be rendered. In the case of a floating panel, the location information may correspond to an initial or default physical location within the workspace display. As described in greater detail below, the use precedence information may be used to resolve in which of a plurality of available panels content should be rendered absent instruction(s) indicating that content should be rendered in a particular panel.

The initial display location of floating panels within the workspace 500 (e.g., the floating panel 522) may be configured by setting, for each floating panel, an anchor point (e.g., a physical location within the workspace 500) at which a predetermined portion (e.g., a corner) of the panel is to be placed. Alternatively or additionally, selected locations or anchor points distributed over the physical display surface associated with the workspace 500 may be associated with different content categories. In those cases, instantiation of a floating panel containing a first type or category of content may be placed at one (or one of a plurality) of anchor points associated with the type or category of content in the floating panel.

The preferred initial size(s) or dimensions of each floating panel may also be configured. For example, the floating panel may be configured to establish its initial size based on the native size of the display device on which the floating panel is to be rendered. In another example, the floating panel may be configured to establish its initial size based on a user-defined preferred size. Alternatively or additionally, each floating panel may be configured to enable or prevent a user from resizing the panel. In the case where the floating panel is configured to be resizable, the floating panel may be rendered with a border suitable for use in windows resizing operations.

Now turning in detail to FIG. 10, the example process 1000 determines whether it has received a request to render a new display (block 1002). If a request to render a new display has been received at block 1002, the process 1000 determines whether a destination panel for the display has been specified (block 1004). If a destination panel has not been specified at block 1004, then the example process 1000 compares the category or categories associated with the display to be rendered to the categories associated with each of available display panels (block 1006). The example process 1000 then determines whether the categories associated with the display match any of the categories associated with the available display panels (block 1008). If the process 1000 determines at block 1008 that none of the categories associated with the display to be rendered match those of available display panels or if the display to be rendered does not include any category information, then the display is assigned to be rendered in the default panel (block 1010).

On the other hand, if the example process 1000 determines at block 1008 that there are matches, then the process 1000 determines whether there are multiple category matches (block 1012). If the process 1000 determines that there are not multiple category matches at block 1012 (i.e., there is only one match), then the example process 1000 assigns the display to be rendered in the matching panel, which may be a fixed or floating panel (block 1014).

If the process 1000 determines at block 1012 that there are multiple available display panels having at least one category that matches at least one category associated with the display then the process 1000 assigns the display to be rendered in one of the matching panels based on a predetermined use order associated with the matching panels (block 1016).

One manner of assigning panels at block 1016 may follow the selection sequence outlined below. First, if possible, the process 1000 assigns the display to a matching fixed panel that is currently without content (e.g., a fixed panel that is blank or unused). If more than one such matching fixed panel exists, then the process selects one of the panels based on the use order of the panels. Second, if there are no matching fixed panels currently without content, then the process 1000 assigns the display to a matching floating panel that is currently closed. Once assigned, the assigned floating panel is opened and the display content is rendered therein. If more than one such floating panel is available, then the process 1000 selects one of the panels based on the use order of the panels. Third, if there are no matching currently closed floating panels, the process 1000 determines if there is a matching currently open floating panel. If more than one currently open floating panel matches, then the process 1000 identifies the open floating panel containing the oldest content and replaces the content of that panel with the new display content. Fourth, if the process 1000 determines that there are no matching currently open floating panels, then the process 1000 determines if there are any matching currently used fixed panels and assigns the new display content to a matching currently used fixed panel. If there is more than one matching currently used fixed panel, then the process 1000 assigns the new display content to one of the matching currently used fixed panels based on the use order of those panels. Alternatively or additionally, the process 1000 may enable a user to manually select in which panel a new display is to be rendered.

The functional blocks or operations described herein may be implemented using any desired combination of software, firmware and hardware. For example, one or more microprocessors, microcontrollers, application specific integrated circuits (ASICs), etc. may access instructions or data stored on machine or processor accessible storage media to carry out the methods and to implement the apparatus described herein. The storage media may include any combination of devices and/or media such as, for example, solid state storage media including random access memory (RAM), read-only memory (ROM), electrically erasable programmable read-only memory (EEPROM), etc., optical storage media, magnetic storage media, etc. In addition, software used to implement the functional blocks may additionally or alternatively be delivered to and accessed by the processor or other device or devices executing the software via the Internet, telephone lines, satellite communications, etc.

Figure 11:
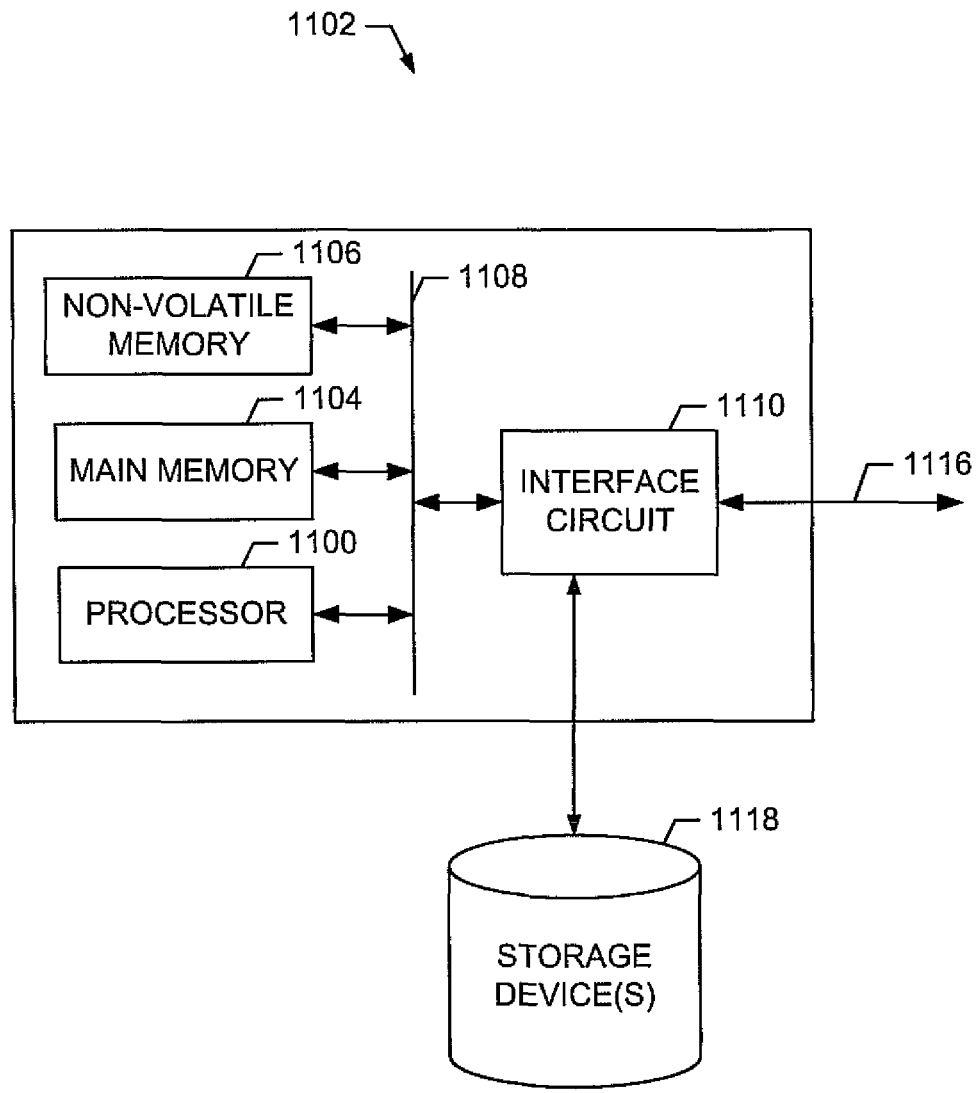
FIG. 11 depicts an example processor system that may be used to implement the apparatus and methods described herein.

FIG. 11 depicts an example processor system 1102 that may be used to implement the apparatus and methods described herein. The example processor-based system 1102 may be, for example, a server, a personal computer, or any other type of computing device.

The processor 1100 may, for example, be implemented using one or more Intel® microprocessors from the Pentium® family, the Itanium® family or the XScale® family. Of course, other processors from other families are also appropriate. The processor 1100 is in communication with a main memory including a volatile memory 1104 and a non-volatile memory 1106 via a bus 1108. The volatile memory 1104 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1106 may be implemented by flash memory and/or any other desired type of non-volatile memory device. Access to the memory 1104 is typically controlled by a memory controller (not shown) in a conventional manner.

The system 1102 also includes an interface circuit 1110. The interface circuit 1110 may be implemented by any type of well-known interface standard to, for example, enable the system 1102 to communicate via one or more of the links 24, 32, 40, 42, 46, and 48 of FIG. 1.

The system 1102 also includes one or more mass storage devices 1118 for storing software and/or data. Examples of such mass storage devices include floppy disk drives, hard drive disks, compact disk drives and digital versatile disk (DVD) drives.

Although certain methods and apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of displaying process control information via a graphical user interface, comprising:
    instantiating a runtime workspace application to operatively interpose between an operator station operating system and a user;
    displaying a plurality of panels via the graphical user interface;
    displaying a portion of the process control information associated with a runtime application in the at least one of the plurality of panels via the runtime workspace application by assigning the portion of the process control information to the at least one of the plurality of panels based on a content category associated with the portion of the process control information; and
    preventing, via the runtime workspace application, a particular user input to the operator station associated with the runtime application from affecting the operating system by preventing the user from accessing a first application while enabling the user to access a second application.

2. A method as defined in claim 1, wherein preventing via the runtime workspace application the particular user input to the operator station from affecting the operating system comprises trapping or interrupting one or more keystrokes associated with an operating system command.

3. A method as defined in claim 1, wherein displaying the plurality of panels comprises displaying at least one of a fixed panel and a floating panel.

4. A method as defined in claim 1, wherein the runtime application comprises at least one of a trending application, a batch processing application, an advanced control application, an alarms application, or a process graphics application.

5. A method as defined in claim 1, wherein the operator station operating system comprises a windows-based operating system.

6. A system for displaying process control information via a graphical user interface, comprising:
    a processor coupled to a memory and programmed to:
        instantiate a runtime workspace application to operatively interpose between an operator station operating system and a user;
        display a plurality of panels via the graphical user interface;
        display a portion of the process control information associated with a runtime application in at least one of the plurality of panels via the runtime workspace application by assigning the portion of the process control information to the at least one of the plurality of panels based on a content category associated with the portion of the process control information; and
        prevent, via the runtime workspace application, a particular user input to the operator station associated with the runtime application from affecting the operating system by preventing the user from disrupting the execution of a first application while enabling the user to enter commands for a second application.

7. A system as defined in claim 6, wherein the processor is programmed to prevent via the runtime workspace application the particular user input to the operator station from affecting the operating system by trapping or interrupting one or more keystrokes associated with an operating system command.

8. A system as defined in claim 6, wherein the processor is programmed to display the plurality of panels by displaying at least one of a fixed panel and a floating panel.

9. A system as defined in claim 6, wherein the runtime application comprises at least one of a trending application, a batch processing application, an advanced control application, an alarms application, or a process graphics application.

10. A system as defined in claim 6, wherein the operator station operating system comprises a windows-based operating system.

11. A machine readable storage device or storage disc having instructions stored thereon that, when executed, cause a machine to:
    instantiate a runtime workspace application to operatively interpose between an operator station operating system and a user;
    display a plurality of panels via the graphical user interface;
    display a portion of process control information associated with the runtime application in at least one of the plurality of panels via the runtime workspace application by assigning the portion of the process control information to the at least one of the plurality of panels based on a content category associated with the portion of the process control information; and
    prevent, via the runtime workspace application, a particular user input to the operator station associated with the runtime application from affecting the operating system by encapsulating the runtime workspace application to insulate the user from the operating system.

12. A machine readable storage device or storage disc as defined in claim 11, wherein the instructions, when executed, cause the machine to prevent via the runtime workspace application the particular user input to the operator station from affecting the operating system by trapping or interrupting one or more keystrokes associated with an operating system command.

13. A machine readable storage device or storage disc as defined in claim 11, wherein the instructions, when executed, cause the machine to display the plurality of panels by displaying at least one of a fixed panel and a floating panel.

14. A machine readable medium as defined in claim 11, wherein the runtime application comprises at least one of a trending application, a batch processing application, an advanced control application, an alarms application, or a process graphics application.

15. A machine readable medium as defined in claim 11, wherein the operator station operating system comprises a windows-based operating system.

16. A method comprising:
   instantiating a runtime workspace application to operatively interpose between an operator station operating system and a user;
   presenting the user with a list of applications the user can access;
   displaying a plurality of panels via a graphical user interface;
   displaying a portion of process control information associated with an application from the list of applications in at least one of the plurality of panels by assigning the portion of the process control information to the at least one of the plurality of panels based on a content category associated with the portion of the process control information; and
   preventing via the runtime workspace application a user input to the operator station from affecting the operating system, wherein the user input is not directed to an application in the list of applications.

17. A method as defined in claim 16, wherein the user input is to instantiate an application.

18. A method as defined in claim 16, wherein the user input is to close an application.

19. A method as defined in claim 16, wherein the user input is to interrupt a command to the operating system.

20. A method as defined in claim 16, wherein the user input is to access data.

21. A method as defined in claim 16, wherein the operating system is a windows-based operating system and the user input is input related to a start dialog.

22. A method as defined in claim 16, wherein the operating system is a windows-based operating system and the user input is input related to a windows task bar.

23. A method as defined in claim 16, wherein the operating system is a windows-based operating system and the user input is input related to a desktop shortcut.

24. A method as defined in claim 16, wherein the operating system is a windows-based operating system and the user input is input related to a run dialog.

25. A method as defined in claim 16, wherein the operating system is a windows-based operating system and the user input is input related to an operating system explorer.

26. A method as defined in claim 16, wherein the user input is to delete a file.

27. A method comprising:
   instantiating a runtime workspace application to operatively interpose between an operator station operating system and a user;
   preventing via the runtime workspace application a user input to the operator station associated with the runtime application from affecting the operating system;
   enabling access to a first set of applications in a first operating mode; and
   enabling access to a second set of applications in a second operating mode, the first operating mode associated with a first set of authorized users and the second operating mode associated with a second set of authorized users, wherein the second set of authorized users are authorized to switch the operating mode between the first operating mode and the second operating mode.

28. A method as defined in claim 27, wherein the second operating mode is less restrictive than the first operating mode.

29. A method as defined in claim 28, wherein the second set of applications includes a greater number of applications than the first set of applications.

30. A method as defined in claim 27, wherein the second set encompasses the first set.

* * * * *